United States Patent [19]
Iwashita

[11] Patent Number: 5,865,442
[45] Date of Patent: Feb. 2, 1999

[54] LIP-LIKE SEAL

[75] Inventor: Tsuguya Iwashita, Okayama, Japan

[73] Assignee: Kurashiki Kako Co., Ltd., Okayama, Japan

[21] Appl. No.: 872,992

[22] Filed: Jun. 11, 1997

[30] Foreign Application Priority Data

Jun. 12, 1996 [JP] Japan ................................. 8-150670

[51] Int. Cl.[6] .............................. F16J 15/32; F16J 9/20; B60T 11/236
[52] U.S. Cl. ............................ 277/436; 92/107; 92/240; 277/437; 277/558; 277/560
[58] Field of Search ..................... 277/558, 560, 277/436, 437, 438, 549; 92/107, 240

[56] References Cited

FOREIGN PATENT DOCUMENTS

| | | |
|---|---|---|
| 1-69973 | 5/1989 | Japan . |
| 1-34744 | 10/1989 | Japan . |
| 2-50564 | 4/1990 | Japan . |
| 2-93570 | 7/1990 | Japan . |

*Primary Examiner*—Anthony Knight
*Assistant Examiner*—Gary Grafel

*Attorney, Agent, or Firm*—Sixbey, Friedman, Leedom & Ferguson, P.C.; Gerald J. Ferguson, Jr.

[57] ABSTRACT

A piston seal has formed on one side of the piston body upon which oil pressure works are a tapered surface portion which extends in a direction away from a piston sliding wall and a parallel surface portion. A lip-like seal is formed of a seal base portion which is, in cross section, approximately triangular to fill a space defined between the tapered surface portion and the piston sliding wall, and a lip portion which is formed integrally with the seal base portion. Q indicates the exertion line of a force which presses the lip portion against the piston sliding wall. T is a normal line which extends from the tapered surface portion towards the piston sliding wall. In order to prevent the lines Q and T from intersecting with each other within the bore, the seal base portion is arranged to lie apart from the lip portion in relation to the axial direction of the bore. Such arrangement produces a distribution of contact force exerted from the piston sliding wall upon the lip-like seal, the distribution having two contact reaction force peak values one of which is caused by the lip portion and the other of which is caused by the seal base portion.

5 Claims, 10 Drawing Sheets

LIP-LIKE SEAL

BACKGROUND OF THE INVENTION

The present invention relates to a lip-like seal for creating liquid-tight sealing between a fluid pressure slid (operated) piston body and a piston sliding wall.

A lip-like seal is known in the art. The lip-like seal has a lip portion. The lip portion diagonally extends from an outer peripheral portion of an end of a piston body on the fluid pressure applied side towards a piston sliding wall. For example, there is shown in Japanese Utility Model Registration Publication Gazette No. 1-34744 and in Japanese Utility Model Application Laying Open Gazette No. 1-69973 such a lip-like seal.

For the case of conventional lip-like seals, a lip portion a is merely arranged to extend towards a piston sliding wall b, as shown in FIG. 9. The problem with such arrangement is that the fitting of a piston body c into a bore d results in producing an unwanted distribution of contact reaction force occurring between the lip portion a and the piston sliding wall b. As shown more specifically in FIG. 10, the resulting distribution is a bell-shaped or a single-peaked distribution having only one peak value p. Such single-peaked distribution has the drawback that a drop in lip portion durability and the occurrence of various damage or the like to lip portions may directly lead to deterioration in sealing action.

Bearing in mind the above-described problems with the prior art sealing techniques, the present invention was made. It is therefore a general object of this invention to improve the action of sealing without causing a drop in lip portion durability.

SUMMARY OF THE INVENTION

With a view to preventing the deterioration described above from occurring, the following technique may be employed. Referring to FIG. 11, a piston body C has a tapered portion e at an edge thereof on the fluid pressure applied side and a lip portion a diagonally extends from the tapered portion e towards a piston sliding wall b. This technique is problematic. As shown in FIG. 11, a force F1 and a force F2 intersect with each other, where the force F1 is a pressing force that presses the lip portion a, which is obliquely opened by fluid pressure exerted from the left-hand side of the figure, against the piston sliding wall b, and the force F2 is a reaction force from the tapered portion e, and, after all, the contact reaction force peak value p is produced at the exertion point of a resultant force F of the force F1 and the force F2 (see FIG. 12). This creates a single-peaked distribution of contact reaction force similar to the distribution shown by FIG. 10.

The single-peaked contact reaction force distribution causes some problems. If, with a view to improving the action of sealing, the coefficient of elasticity (the rigidity) of lip portions is increased by controlling, for example, the extension length and thickness of a lip portion and rubber material so as to increase the contact reaction force's peak value p, local stress concentration then occurs in the lip portion. This may result in a drop in lip portion durability. On the other hand, if the rigidity is decreased with a view to improving sealing action, this may also result in a drop in sealing action. Further, the single-peaked distribution produces the disadvantage that a drop in the durability of lip portions and the occurrence of damage or the like to lip portions may directly lead to deterioration in sealing action.

The present invention provides an improved lip-like seal having the ability to improve the action of sealing without suffering a drop in the durability of lip portion.

The present invention provides an improved lip-like seal for use in a piston body which is closely fitted into a bore and which slides in said bore under fluid pressure, applied to said piston body from a first side with reference to the axial direction of said bore, towards a second side with reference to said bore axial direction opposite to said first side, said lip-like seal having a lip portion which diagonally extends from a peripheral surface portion of said piston body towards said first side so as to intersect with a piston sliding wall defined by said bore;

wherein, in order to establish a distribution of contact reaction force resulting from contact with said piston sliding wall having at least two different reaction force peak values including a first peak value caused by said lip portion and an additional, second peak value occurring at a distant position from where said first peak value occurs on said second side, a seal base portion is formed, on said second side, integrally with said lip portion, said seal base portion continuously extending from the base of said lip portion to adhere to a peripheral surface portion of said piston body to allow said second peak value to occur.

In accordance with the above-described invention, when fluid pressure is applied from the first side to the piston body closely fitted into the bore, two different contact reaction force peaks are produced at spaced-apart positions of the piston sliding wall with reference to the axial direction of the bore. One peak (the first peak) is produced by the lip portion and the other peak (the second peak) is produced by the seal base portion. This arrangement provides a double-peaked distribution of contact reaction force with two peak values occurring at spaced-apart positions with reference to the bore axial direction. The action of sealing (pressure resistance) between the piston body and the piston sliding wall can be improved by the provision of these two contact reaction force peaks. Additionally, even when a lip portion leading edge damages, sealing action is insured by the seal base body (the second contact reaction force peak). This achieves an improved fail-safe mechanism for sealing between the piston body and the piston sliding wall.

In the present invention, each element may be specified and other elements may be included, as shown in the following examples (from a first to a fourth case).

It is preferred in the lip-like seal that:

a tapered surface portion is formed on an outer peripheral surface portion of said piston body on said first side, said tapered surface portion extending towards said first side in such a manner as to gradually depart away from said piston sliding wall; and said seal base portion is formed having an approximately triangular cross-section so as to fill a space defined between said tapered surface portion and said piston sliding wall, and said lip portion is formed integrally with said seal base portion such that said lip portion extends from a surface portion of said seal base portion on said piston sliding wall's side at an end of said seal base portion on said first side.

In accordance with the first case, a contact reaction force peak occurs in the lip portion by a elastic restoring force caused by the lip portion being bent by the piston sliding wall and by a pressing force by fluid pressure pressing the lip portion towards the piston sliding wall. On the other hand, due to compressive force towards the second side exerting upon the seal base portion caused by bending of the lip portion and fluid pressure, reaction force is applied from the seal base portion to the piston sliding wall in a direction normal to the tapered surface portion. As a result, the second contact reaction force peak occurs in the seal base portion. It is therefore ensured that there is produced, between the seal base portion and the piston sliding wall, another contact reaction force peak other than the one caused by the lip portion.

It is preferred in the lip-like seal that:

a parallel surface portion is formed, extending, in approximately parallel to said piston sliding wall, from an end of said tapered surface portion on said first side towards said first side; and said lip portion is formed such that a leading edge of said lip portion is located nearer to said second side than an end of said parallel surface portion on said first side so as to define an annular space having an approximately triangular cross-section.

In accordance with the second case, fluid pressure, exerting upon the piston body from the first side with reference to the bore axial direction, is concentrated in the annular space defined between the parallel surface portion and the rear surface of the lip portion, and the fluid pressure works so as to press the lip portion from the rear side thereof towards the piston sliding wall. Further, as a result of the arrangement that the lip leading edge is located nearer to the second side than one edge of the parallel surface portion of the piston body located on the first side, interference between the end of the bore and the lip leading edge can be prevented even when operating fluid pressure is relieved.

It is preferred in the lip-like seal that said lip portion is formed at a distant position from said seal base portion on said first side in order not to intersect with a normal line extending from said tapered surface portion towards said piston sliding wall.

In accordance with the third case, a reaction force exerting upon the piston sliding wall from the seal base body in a direction normal to the tapered surface portion occurs independently of a pressing force from the lip portion to the piston sliding wall. This further ensures that two different contact reaction force peaks are produced at spaced-apart positions with reference to the bore axial direction, thereby producing a double-peaked distribution of contact reaction force.

It is preferred in the lip-like seal that:

said bore is formed into a cylindrical form and said piston body is formed into a doughnut-like form so as to fit into said cylindrical bore; and an outer peripheral surface portion of said doughnut-like piston body is provided with said lip portion and seal base portion for a piston sliding wall inwardly facing in a direction radially of said cylindrical bore, while an inner peripheral surface portion of said doughnut-like piston body is provided with said lip portion and seal base portion for a piston sliding wall outwardly facing in a direction radially of said cylindrical bore.

The fourth case shows a lip-like seal for sealing between the doughnut-like piston body and the bore in which the piston is fitted. In this lip-like seal, the lip portion and seal base portion are formed on each of the outer and inner peripheries of the piston body, whereby two different contact reaction force peaks occur at each periphery in the bore axial direction. The action of sealing is improved and the durability of lip portions is achieved under more reliable fail-safe condition.

DETAILED DESCRIPTION OF THE PREFERRED EMBODIMENTS

Preferred embodiments of the present invention are now described below by making reference to the accompanying drawing figures.

Figure 1:
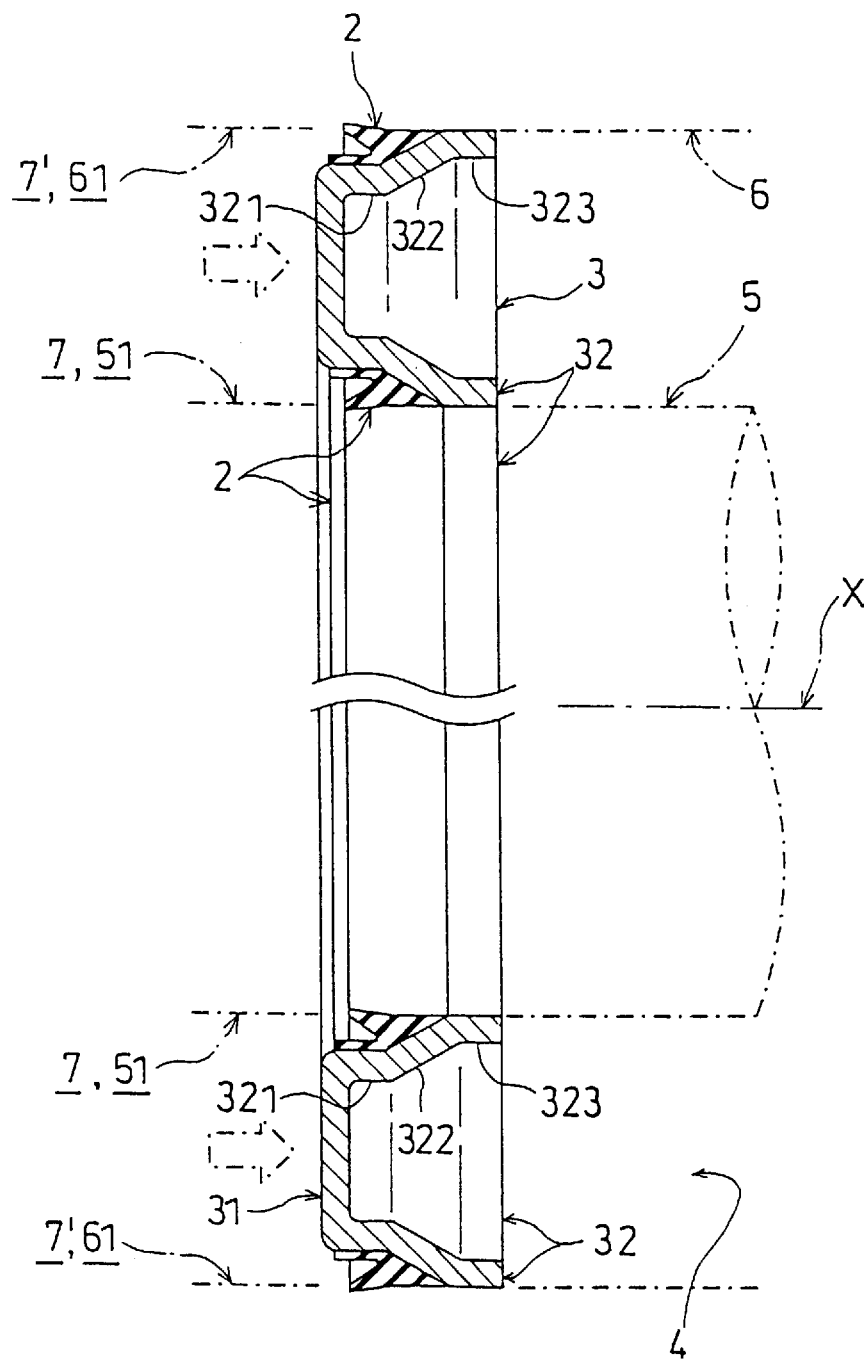
FIG. 1 is a longitudinal cross-sectional view of a piston body employing an embodiment of the present invention.

Referring first to FIG. 1, there is shown a lip-like seal 2 in accordance with the present invention. 3 is a piston body. 4 is a bore. The piston body 3 is fitted into the bore.

More specifically, the doughnut-like or the ring-like piston body 3 is fitted into the cylindrical bore 4 defined between an outer peripheral surface 51 of a shaft 5 and an inner peripheral surface 61 of an exterior casing (housing) accommodating therein the shaft 5. Oil pressure is applied to the piston body 3 from the left-hand side of FIG. 1, in other words, from a first side with reference to the axial direction of the bore 4. The bore's 4 axial direction is hereinafter referred to simply as the bore axial direction X. The piston body 3 slides in the bore 4 towards a second side with reference to the bore axial direction X opposite to the first side, in other words towards, the right-hand side. There are two circumferential surfaces which serve as a piston sliding wall 7 and a piston sliding wall 7' for the doughnut-like piston body 3 (i.e., the outer peripheral surface 51 of the shaft 5 and the inner peripheral surface 1 of the housing 6). Both an outer peripheral surface portion and an inner peripheral surface portion of the piston body 3 are provided with the lip-like seal 2 as shown in FIG. 1.

Figure 2:
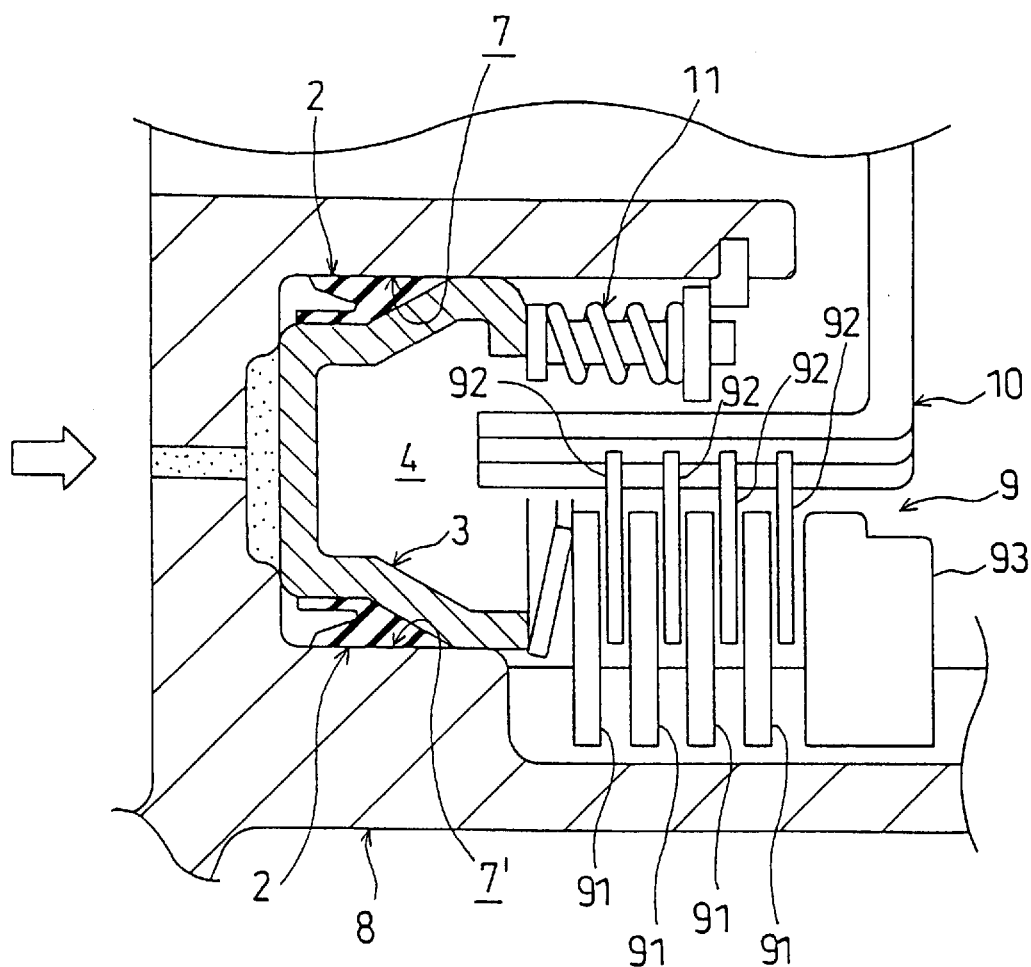
FIG. 2 is a cross-sectional view of a clutch system incorporating therein the piston body shown in FIG. 1.

The present embodiment is applicable in a clutch mechanism for use in an automobile automatic transmission for ON/OFF control by means of oil pressure. This application is illustrated by reference to FIG. 2. The outer peripheral surface 51 of the shaft 5 is the piston sliding wall 7 facing outwardly in a direction radially of the shaft 5, while on the other hand the inner peripheral surface 61 of the housing 6 is the piston sliding wall 7' enclosing the outer peripheral surface 51 and facing inwardly in the radial direction. These two piston sliding walls 7 and 7' are integral portions of a housing 8 of the automatic transmission. Defined between the piston sliding walls 7 and 7' is a cylindrical chamber as the cylindrical bore 4. The doughnut-like piston body 3 is fitted into the bore 4. 9 is a clutch. The clutch 9 has a plurality of pressure rings 91 and a plurality of pressure plates 92. The pressure rings 91 are movably coupled, by spline coupling or such coupling technique, to the housing 8 in order that they may move axially. The pressure plates 92, which are sandwiched between two adjoining pressure rings 91 are coupled to a rotatable portion 10 in order that they may move axially. When oil pressure is exerted on the piston body 3 from the left-hand side of the figure, the piston body 3 accordingly travels towards the right, whereby the pressure rings 91 and the pressure plates 92 are squeezed between the piston body 3 and a fixed portion 93. As a result, the rotatable portion 10 is prevented from rotating and, at the same time, operating fluid is discharged and the piston body 3 returns to the home position (the position shown in FIG. 2) by energization force by a spring 11 to allow the rotatable portion 10 to resume rotating.

For convenience, the present embodiment is illustrated in terms of a model shown in FIG. 1. The piston body 3 is formed as follows. A plate-like material is processed, by stamping, into an endless, doughnut shape to form the piton body 3. The piston body 3 has a bottom wall 31 and a cross-section in the form of a groove which opens from a pair of groove walls 32 towards the right-hand side of the figure, i.e., towards the second side with reference to the bore axial direction X. By the processing of stamping, each groove wall 32 has a first parallel surface portion 321 a tapered surface portion 322, and a second parallel surface portion 323. The portion 321 extends parallel with the piston sliding wall 7 (7') from the bottom wall 31. The portion 322 bends at the right-hand side edge of the portion 321 and inclines and extends towards the piston sliding wall 7 (7'). The portion 323 bends at the right-hand side edge of the portion 322 and extends parallel with the piston sliding wall 7 (7').

Figure 3:
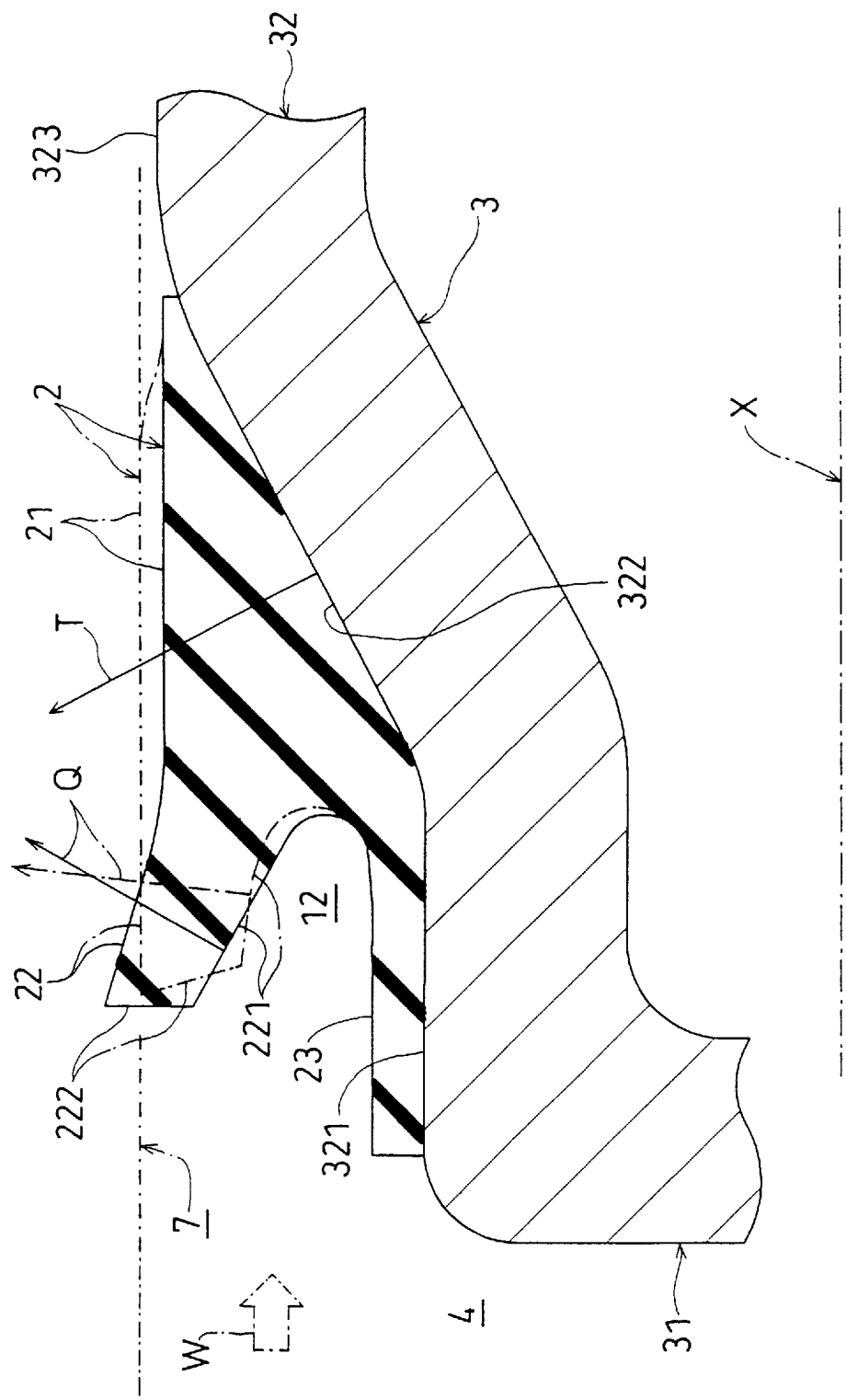
FIG. 3 is an enlarged fragmentary sectional view partly showing the piston body of FIG. 1.

The lip-like seal 2 is formed, by vulcanization adhesion, on an exterior surface portion extending from the first parallel surface portion 321 to the tapered surface portion 322 of the groove wall 32 of each of the foregoing inner and outer peripheries of the piston body 3. As shown in detail in FIG. 3, the lip-like seal 2 is basically formed of a seal base portion 21 and a lip portion 22. The seal base portion 21 is formed into an approximately triangle in cross section so as to fill a space defined between the tapered surface portion 322 and the piston sliding wall 7 (7'). As shown in FIG. 3, the lip portion 22 extends from a right-hand side edge portion of the the seal base portion 21 (i.e., an upper portion of the seal base portion 21 which lies on the first side with reference to the bore axial direction X as well as on the side of the piston sliding wall 7 (7'), to diagonally intersect with the piston sliding wall 7 (7'). 23 is a covering portion, extending from the seal base portion 21 so as to cover the first parallel surface portion 321.

The lip portion 22 and the seal base portion 21 are spaced apart from each other in reference to the bore axial direction X, to prevent a normal line T from intersecting with an exertion line Q inside the bore 4. The normal line T indicates a direction in which reaction force is exerted from the seal base portion 21 upon the piston sliding wall 7 (7'), and the exertion line Q is an exertion line of oil pressure from a rear surface 221 of the lip portion 22 (pressing force from the lip portion 22 to the piston sliding wall 7 (7')). In other words, the seal base portion 21 is spaced apart from the lip portion 22 with reference to the bore axial direction X in order that the normal line T and the exertion line Q shall not intersect with each other within the bore 4 or in order that the lines T and Q shall intersect with each other outside the piston sliding wall 7 (7'). To sum up, a reaction force from the seal base portion 21 to the piston sliding wall 7 (7') and a pressing force from the lip portion 22 to the piston sliding wall 7 (7') are arranged to be applied to respective spaced-apart positions with reference to the bore axial direction X. A lip leading edge 222 of the lip portion 221 is located so as not to exceed the outer surface of the bottom wall 31 at the first side with reference to the bore axial direction X, in other words the lip leading edge 222 is set back of the bottom wall 31 to the right in the figure. A space 12 is defined between the lip portion 22 and the covering portion 23 (i.e., the first parallel surface portion 321), having an approximately tri-angular cross-section.

The operation of the lip-like seal 2 having the above-described structure is now illustrated. The piston body 3 is fitted into the bore 4 and an oil pressure (W) is applied from the left-hand side of FIG. 3. As a result, in addition to a bending restoring force resulting from the fitting of the piston body 3 into the bore 4, a pressing force, caused by oil pressure against the rear surface 221, presses the lip portion 22 onto the piston sliding wall 7 (7') in the direction of the exertion line Q, and the seal base portion 21 expands towards the piston sliding wall 7 (7') by bending of the lip portion 22 and by oil pressure exerted upon the walls defining the space 12, whereby the piston sliding wall 7 (7') is pressed by reaction force applied from the tapered surface portion 322 in the direction of the normal line T.

Figure 4:
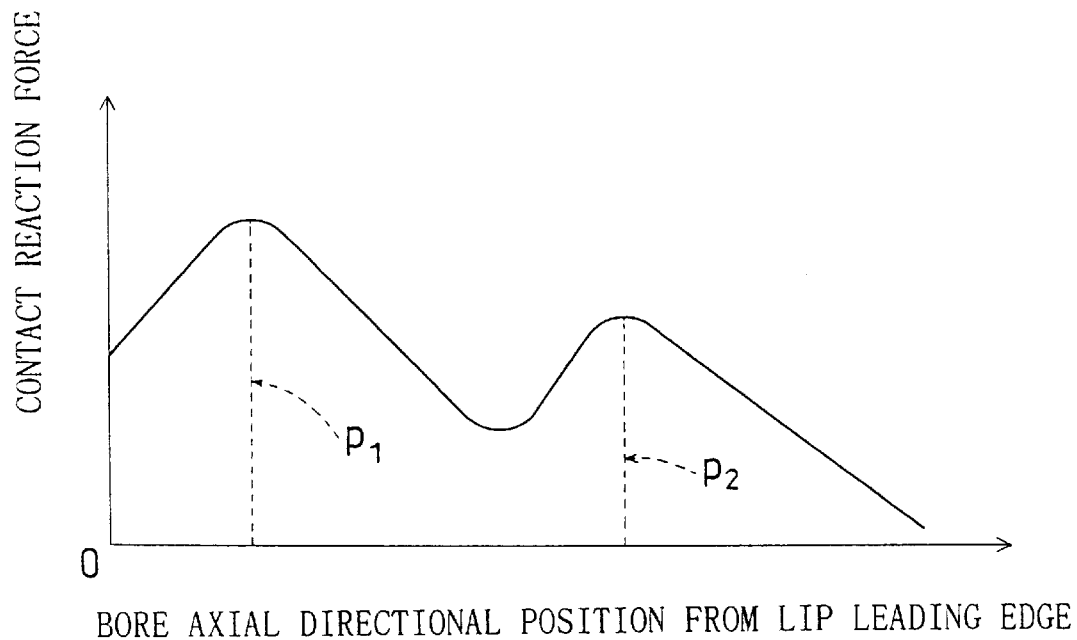
FIG. 4 graphically shows a relationship between the bore-axial direction position from a lip leading edge and the con action force.

FIG. 4 graphically shows a resulting distribution of contact reaction force of the lip-like seal 2 with respect to the piston sliding wall 7 (7') in the present embodiment. As shown in the graph in which the abscissa shows the position from the lip leading edge 222, at which the contact reaction force is zero, the distribution has two contact reaction force peak values p1 and p2 in the direction to the second side. The peak value p1 is caused by the lip portion 22, while the peak value p2 is caused by the seal base portion 21. Accordingly, higher pressure resistance is achieved between the piston sliding wall 7 and the lip-like seal 2, therefore improving the action of sealing. Even in the event that the lip portion 22 (for example, the lip edge 222) damages, sealing action is ensured by the seal base portion 21 (the peak value p2), thereby providing a fail-safe condition.

In order to prove the present embodiment's operation and effects, the FIG. 3 model was analyzed using a finite element method (FEM). The results are shown below.

Figure 5:
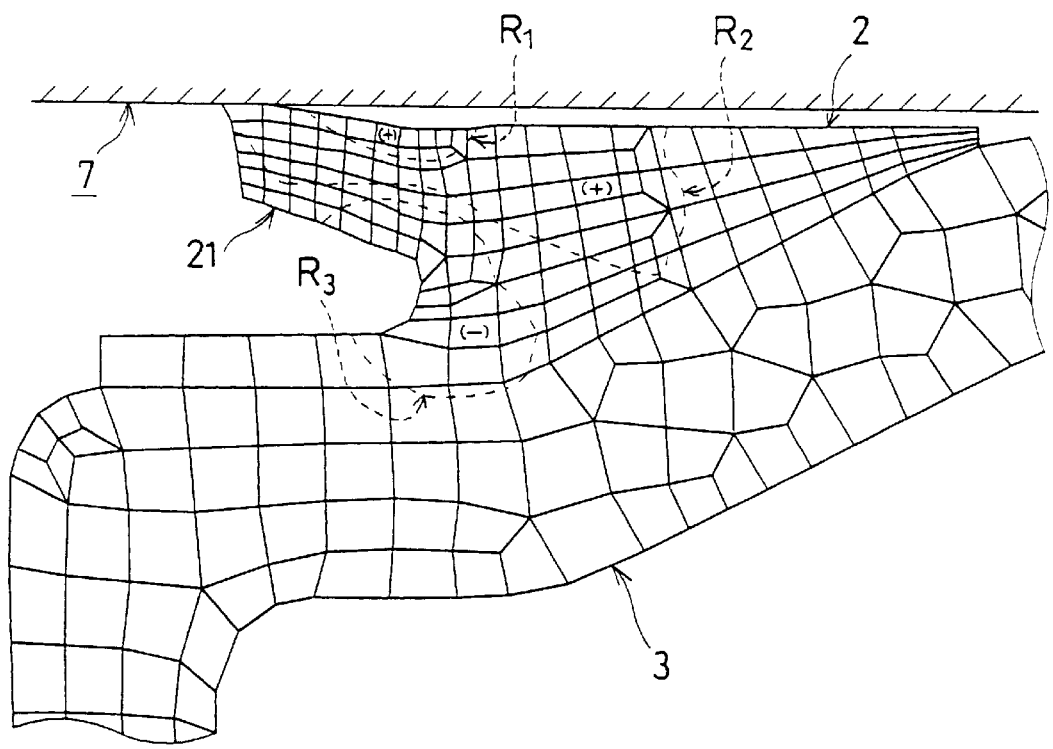
FIG. 5 is an FEM analysis diagram showing deformation and created stress for the portion shown in FIG. 3 time when no fluid pressure is applied thereto.

Referring now to FIG. 5, there is shown the deformation and stress of the lip-like seal 2 disposed around the piston body 3 fitted into the bore 4, at the time when no oil pressure is applied (oil pressure=zero). In this case the lip portion 22 is bent by the piston sliding wall 7 (7') and upper surface regions extending from the lip portion 21 to the seal base portion 22 become tensile stress (+) regions R1 and R2, while on the other hand, a region surrounding the space 12 becomes a compressive stress (−) region R3. In the tensile stress (+) regions R1 and R2, tensile stress (+) increases from bottom to top. Additionally, the compressive stress (−) region R2 extends towards the seal base portion 21, and in relation to the compressive stress (−) region R3 the tensile stress (+) region R2 of the seal base portion 21 is pulled towards the piston sliding wall 7 (7').

Figure 6:
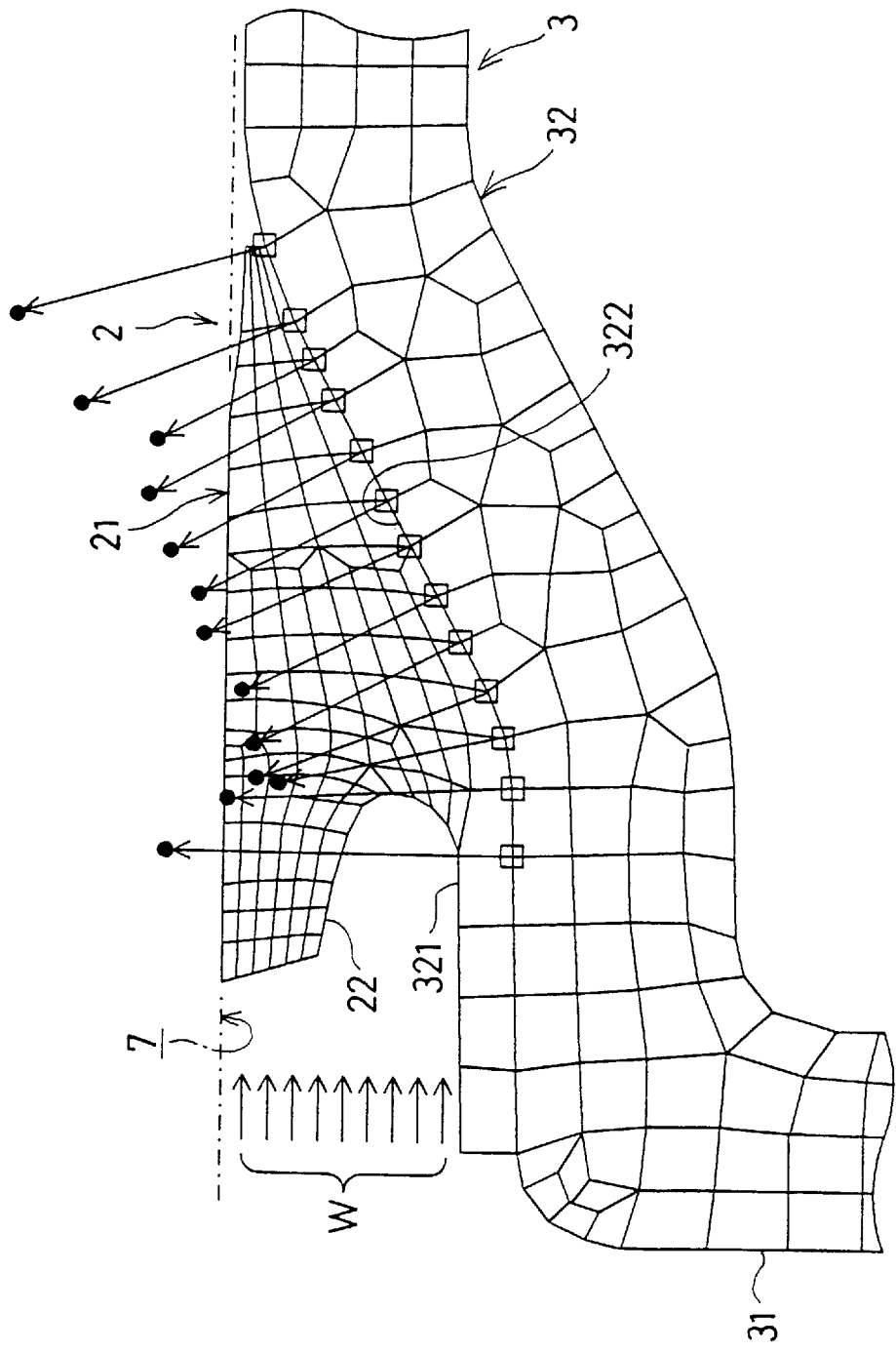
FIG. 6 is an FEM analysis diagram showing deformation and reaction force from the piston body for the portion shown in FIG. 3 at the time when fluid pressure is applied thereto.

Referring now to FIG. 6, there is shown the deformation of the lip-like seal 2 at the time when the oil pressure W is applied. FIG. 6 further shows the magnitude and orientation of reaction force from outer surface positions of the tapered surface portion 322 and first parallel surface portion 321 of the piston body 3 to the piston sliding wall 7 (7'), due to the provision of the lip-like seal 2. In this case, by expanding of the seal base body 21 towards the piston sliding wall 7 (7') and by compression associated with the expanding, reaction force is applied to the piston sliding wall 7 (7') from the tapered surface portion 322 in a direction normal thereto. By pressing force, caused by the bending of the lip portion 22 and the oil pressure W, reaction force is applied from the first parallel surface portion 321 to the piston sliding wall 7 (7') in a direction normal thereto.

Figure 7:
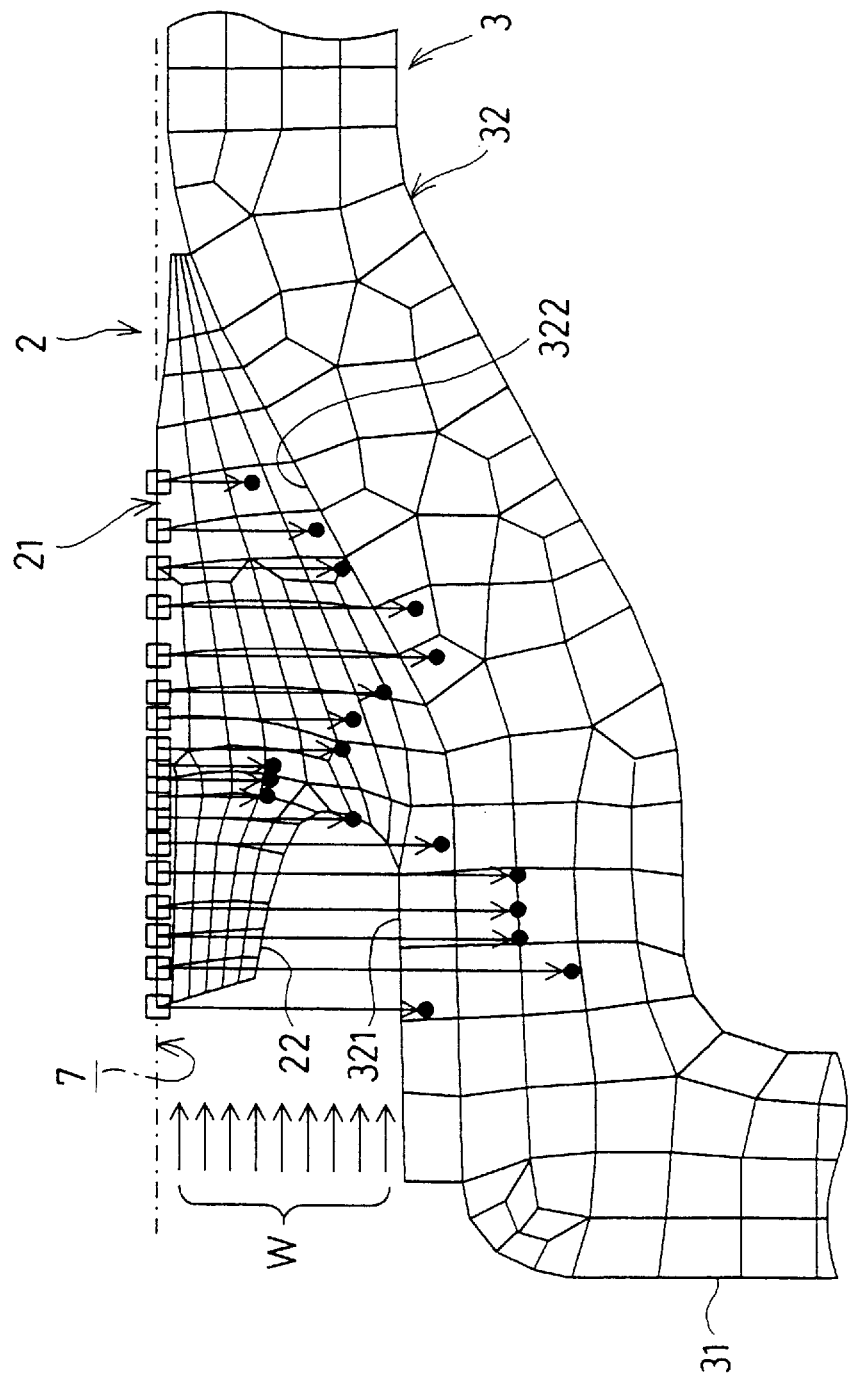
FIG. 7 is an FEM analysis diagram showing deformation and contact reaction force from a piston sliding wall for the portion shown in FIG. 3 at the time when fluid pressure is applied thereto.
Figure 8:
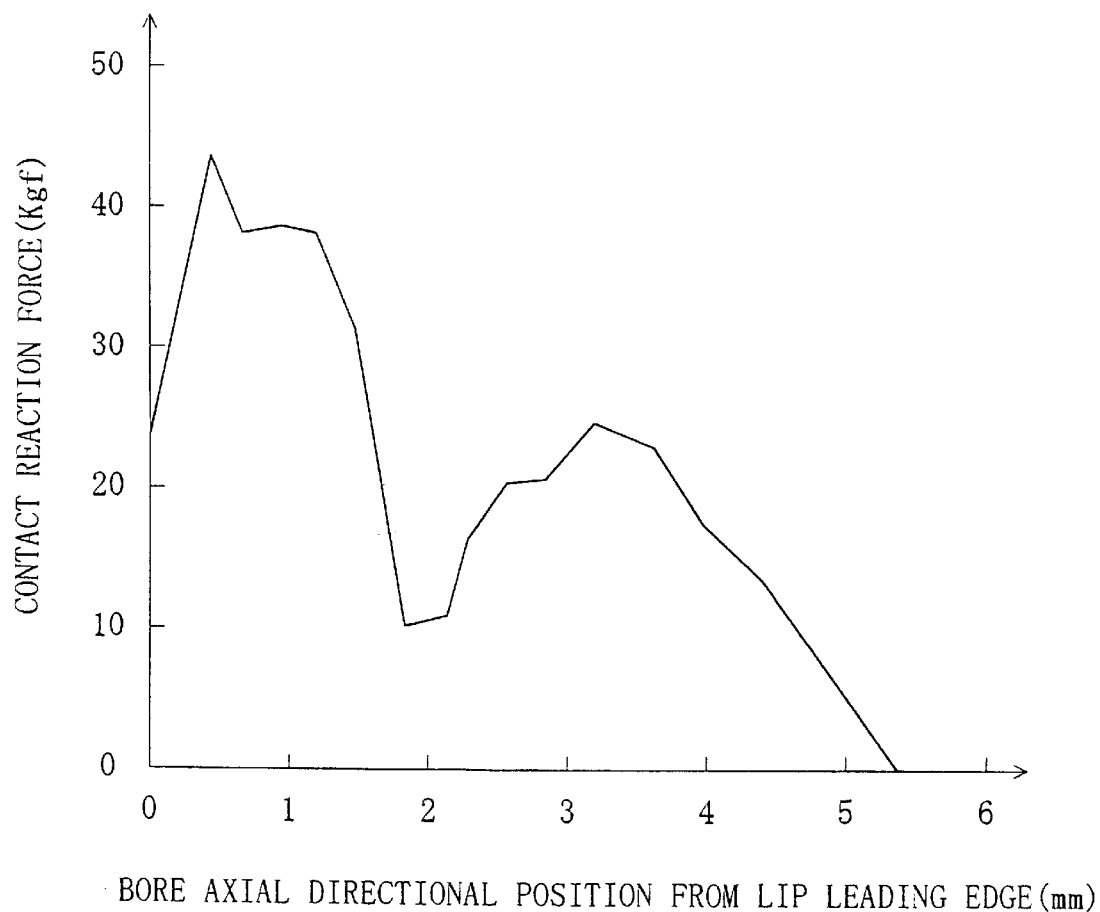
FIG. 8 graphically shows a relationship between the bore-axial direction position from a lip leading edge and the contact reaction force for the case of FIG. 7.
Figure 9:
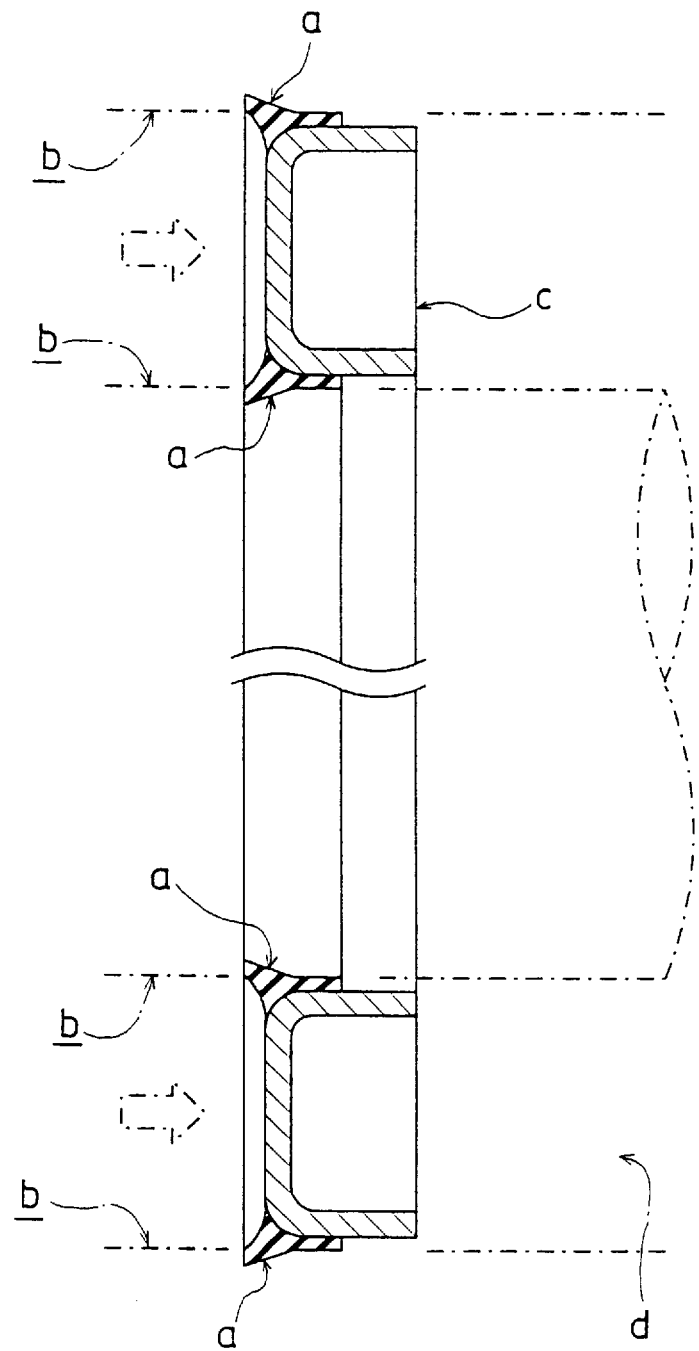
FIG. 9 is a corresponding view to FIG. 1 showing a conventional lip-like seal.
Figure 10:
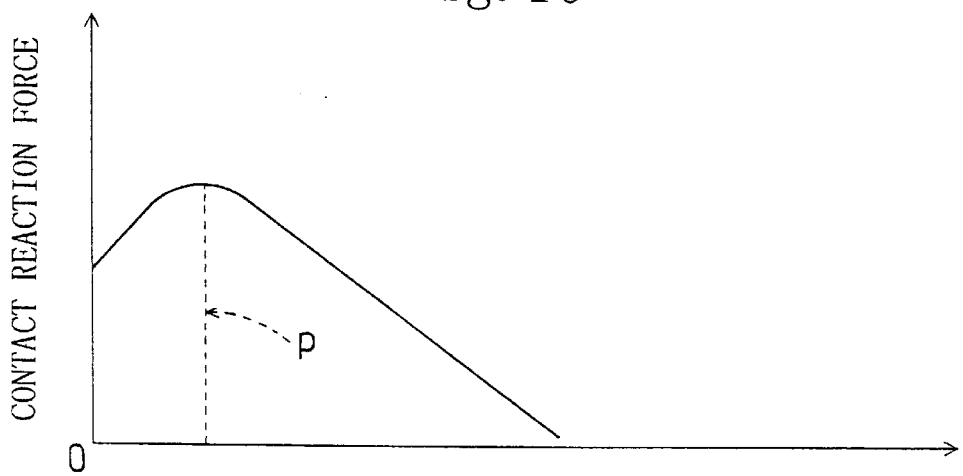
FIG. 10 graphically shows a relationship between the bore-axial direction position from a lip leading edge and the contact reaction force for the case of the conventional lip-like of FIG. 9.
Figure 11:
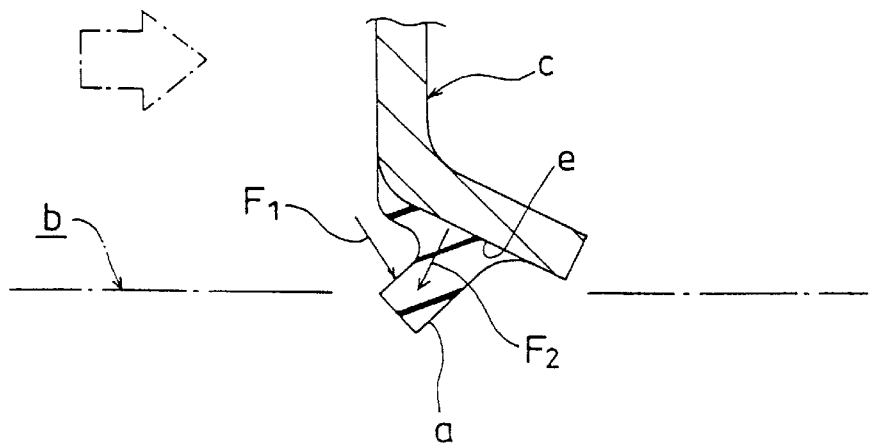
FIG. 11 is a fragmentary sectional view of another conventional lip-like seal.
Figure 12:
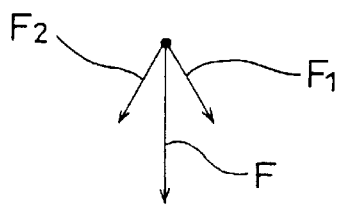
FIG. 12 is a view useful in understanding composition of forces in the case of FIG. 11.

Referring now to FIG. 7, there is shown the deformation of the lip-like seal 2 at the time when the oil pressure W is applied. FIG. 6 further shows the magnitude of contact reaction force exerted upon the lip-like seal 2 from respective positions of the piston sliding wall 7 (7') for a range from the lip leading edge 222 to the second side with reference to the bore axial direction X (i.e., the right-hand side of the figure). As shown in FIG. 7, the contact reaction force first peaks at a point located a little to the right from the lip leading edge 222 of the lip portion 22, then falls at the root of the lip portion 22, and thereafter again peaks in the vicinity of the center of the seal base portion 21 with reference to the bore axial direction. These changes in the contact reaction force are shown in FIG. 8. As can be seen from FIG. 8, there occur two contact reaction force peaks at two spaced-apart positions.

OTHER EMBODIMENTS

It is to be noted that the present invention is not limited to the foregoing embodiments. The present invention includes various types of embodiments in addition to the foregoing embodiments. In each of the foregoing embodiments, the piston body 3 has the first parallel surface portion 321. In stead of using the piston body 3, any other piston body may be employed as long as it includes the tapered surface portion 322.

In the foregoing embodiments, the lip-like seal 2 comprises the seal base portion 21 and the lip portion 22. Instead of using the lip-like seal 2, any other lip-like seal may be employed as long as it includes a seal portion integral with the lip portion 22 which is formed to adhere to an outer surface portion of the piston body 3 and which has the ability to create a contact reaction force peak independently of the lip portion 22.

In each of the foregoing embodiments of the present invention, the doughnut-like piston body 3 is fitted into the cylindrical bore 4. A piston body with a circular cross-section may be fitted into a bore 4 with a circular cross-section. In such a case, a combination of the tapered surface portion 322, the seal base portion 21 and the lip portion 22, shown in the foregoing embodiments, may be formed on an outer surface portion of the piston body.

The invention claimed is:

1. A lip-like seal for use in a piston body which is closely fitted into a bore and which slides in said bore under fluid pressure, applied to said piston body from a first side with reference to the axial direction of said bore, towards a second side with reference to said bore axial direction opposite to said first side, said lip-like seal having a lip portion which diagonally extends from a peripheral surface portion of said piston body towards said first side so as to intersect with a piston sliding wall defined by said bore;

wherein, in order to establish a distribution of contact reaction force resulting from contact with said piston sliding wall having at least two different reaction force peak values including a first peak value caused by said lip portion and an additional, second peak value occurring at a distant position from where said first peak value occurs on said second side, a seal base portion is formed, on said second side, integrally with said lip portion, said seal base portion continuously extending from the base of said lip portion and being adhered to said peripheral surface portion of said piston body to allow said second peak value to occur, wherein a tapered surface portion is formed on an outer peripheral surface portion of said piston body on said first side, said tapered surface portion extending towards said first side in such a manner as to continuously depart away from said piston sliding wall.

2. A lip-like seal as claimed in claim 1, wherein said seal base portion is formed having an approximately triangular cross-section so as to fill a space defined between said tapered surface portion and said piston sliding wall, and said lip portion is formed integrally with said seal base portion such that said lip portion extends from a surface portion of said seal base portion adjacent said piston sliding wall at an end of said seal base portion on said first side.

3. A lip-like seal as claimed in claim 2, wherein a parallel surface portion of said lip-like seal is formed, extending, in approximately parallel to said piston sliding wall, from an end of said tapered surface portion on said first side towards said first side; and wherein said lip portion is formed such that a leading edge of said lip portion is located nearer to said second side than an end of said parallel surface portion on said first side so as to define an annular space having an approximately triangular cross-section.

4. A lip-like seal as claimed in claims 2 or 3 wherein said lip portion is formed at a distant position from said seal base portion on said first side in order to prevent a normal line extending from said tapered surface portion towards said piston sliding wall from intersecting with an exertion line of pressing force from said lip portion to sid piston sliding wall.

5. A lip-like seal as claimed in claim 1, wherein said bore is formed into a cylindrical form and said piston body is formed into a doughnut-like form so as to fit into said cylindrical bore; and wherein an outer peripheral surface portion of said doughnut-like piston body is provided with said lip portion and seal base portion adjacent a piston sliding wall inwardly facing in a direction radially of said cylindrical bore, while an inner peripheral surface portion of said doughnut-like piston body is provided with said lip portion and seal base portion for a piston sliding wall outwardly facing in a direction radially of said cylindrical bore.

* * * * *

UNITED STATES PATENT AND TRADEMARK OFFICE
CERTIFICATE OF CORRECTION

PATENT NO. : 5,865,442
DATED : February 2, 1999
INVENTOR(S) : Tsuguya IWASHITA

It is certified that error appears in the above-identified patent and that said Letters Patent is hereby corrected as shown below:

Claim 4, line 6, change "sid" to --said--.

Signed and Sealed this

Twenty-first Day of September, 1999

*Attest:*

Q. TODD DICKINSON

*Attesting Officer*     *Acting Commissioner of Patents and Trademarks*